Sept. 21, 1943.  E. P. DRAKE ET AL  2,329,984
FEEDING MECHANISM
Original Filed March 6, 1940  3 Sheets-Sheet 1
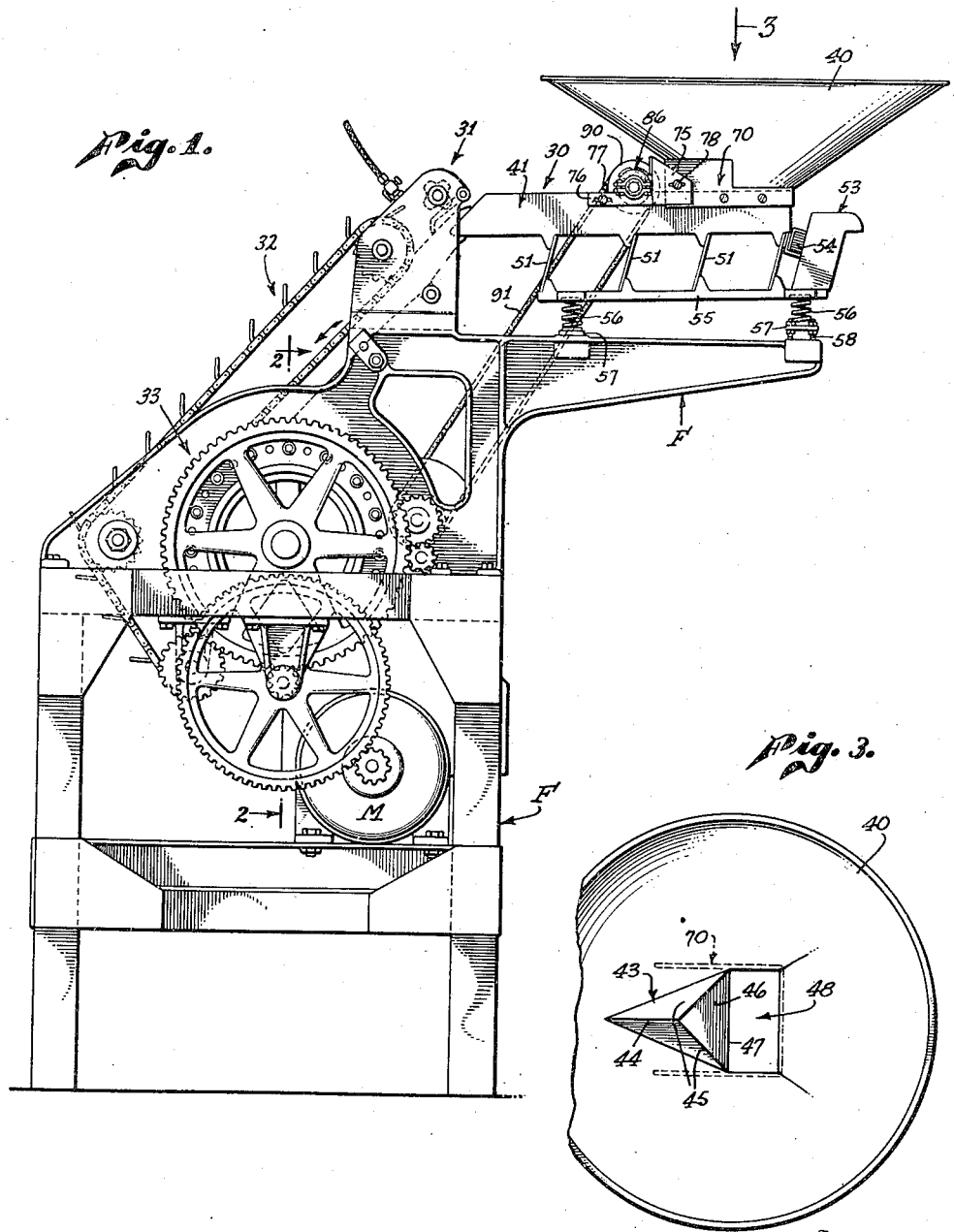
Inventors
EDWARD P. DRAKE,
FRED J. ALBERTY,
WILLIAM H. KAGLEY,
By Lebbert A. Hulber
Attorney

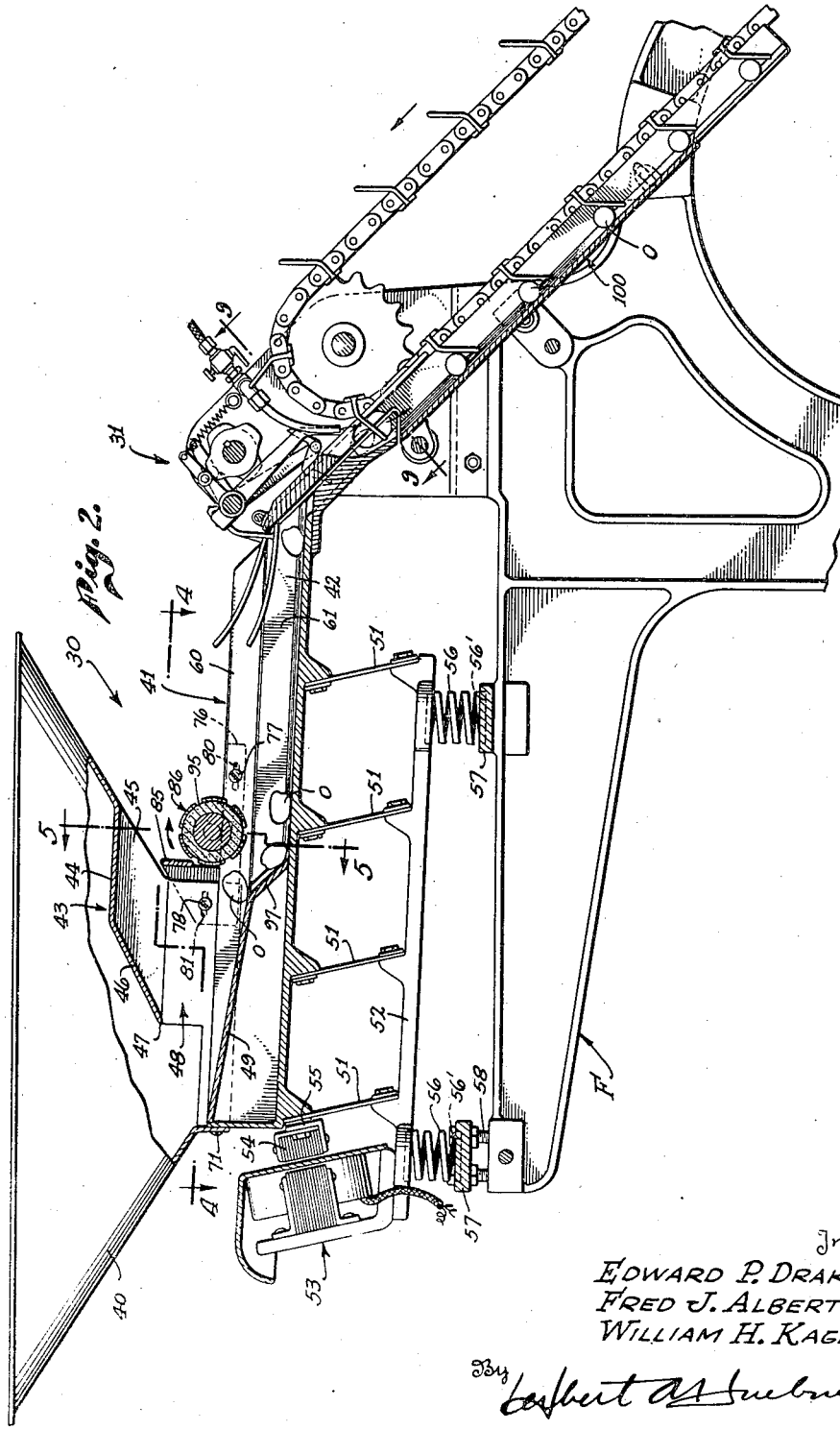

Sept. 21, 1943.  E. P. DRAKE ET AL  2,329,984
FEEDING MECHANISM
Original Filed March 6, 1940  3 Sheets-Sheet 3
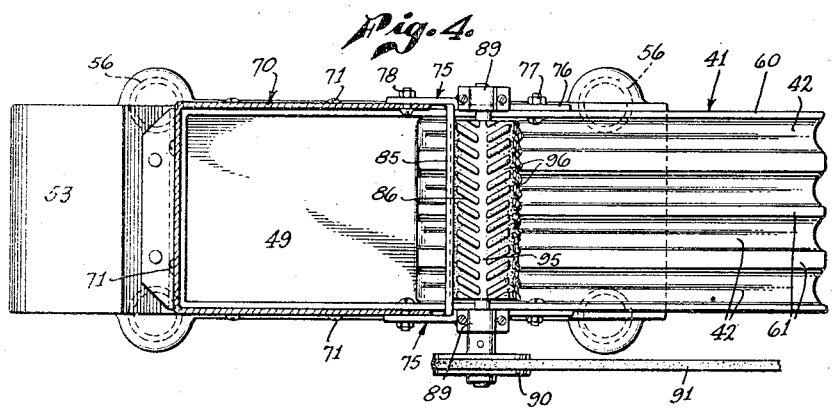
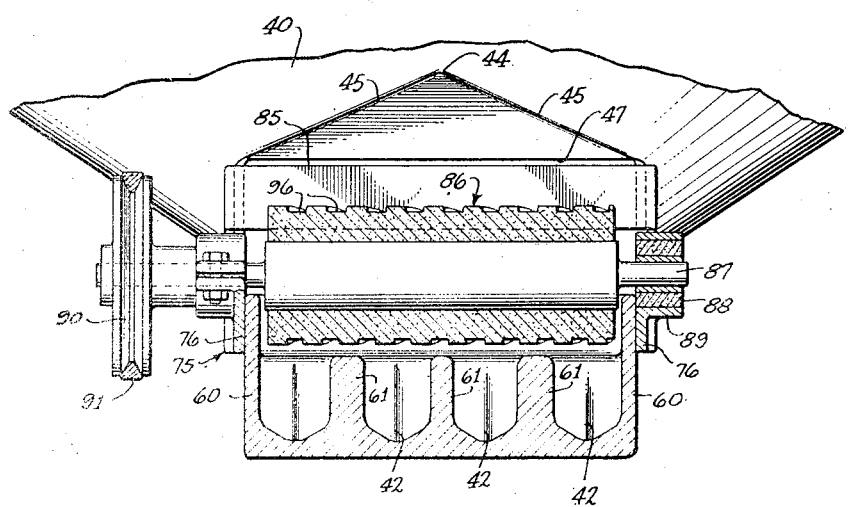
Inventors
EDWARD P. DRAKE,
FRED J. ALBERTY,
WILLIAM H. KAGLEY,
Attorney Patented Sept. 21, 1943

2,329,984

UNITED STATES PATENT OFFICE 2,329,984

FEEDING MECHANISM

Edward P. Drake and Fred J. Alberty, Los Angeles, and William Herbert Kagley, Lindsay, Calif., assignors to Lindsay Ripe Olive Company, Lindsay, Calif., a corporation Original application March 6, 1940, Serial No. 322,540. Divided and this application February 7, 1941, Serial No. 377,941

10 Claims. (Cl. 198—30)

This application relates to improvements over certain features of the invention described and claimed in the United States Letters Patent of Edward P. Drake, No. 2,205,397, granted June 25, 1940, for Automatic pitting machine, and also improvements over the invention disclosed and claimed in the copending application of Edward P. Drake, Serial No. 245,341, filed December 13, 1938, for Automatic olive pitting machine, patent granted June 24, 1941, No. 2,246,843. It is a division of our application Serial No. 322,540, filed March 6, 1940, for Automatic machine for pitting fruit, patent granted March 23, 1943, No. 2,314,484.

This invention relates primarily to the fruit packing industry and to a feeding mechanism for receiving fruit, such for example, as olives, and feeding them in rows for subsequent handling, as for instance, aligning and pitting operations. The mechanism is adaptable to feeding various kinds of articles but in the environment chosen for illustration is shown in combination with an olive pitting machine.

In removing pits from olives it is necessary that each olive be firmly grasped in a predetermined aligned position while a punch enters from one end of the olive and is forced longitudinally therethrough, or the olive is forced against the punch by means of a die, to push the pit out through the end of the olive. In the case of olives the pits may not be struck out through the sides as to do so destroys the olive for the commercial purposes intended. This is because both olives and pits are oblong.

Previous machines for feeding, metering, aligning, and pitting olives have been introduced. In one of these olives are individually placed by hand in dies which hold the olives during the punching operation. The slowness, expense, and danger to the attendants of such hand fed machines make their use impractical for large scale commercial production. In the Drake Patent No. 2,205,397, heretofore mentioned, a form of automatic pitting machine is disclosed in which the olives need not be hand fed but are supplied in bulk to a hopper and are fed, aligned, and positioned by the machine for the punching operation. It is believed that this is the first olive pitting machine in which bulk olives are automatically fed directly to the pit ejecting mechanism. In the copending application, Serial No. 245,341, certain improvements are disclosed over the earlier patented machine. The present application utilizes the same basis of design and operation as in the previous Drake application, but contains a number of improvements and refinements as well as certain additional parts which have been found to materially increase the speed and efficiency of the machine.

An object of the present invention is to provide a mechanism adapted to handle a continuous supply of fruit, such as olives or other articles to be fed from bulk which may be from boxes or any other bulk source delivered into a hopper, and to transfer from the hopper a continuous flow of the olives or other articles in rows for further handling.

Another object is to provide in a device of the character described a hopper mounted integrally with a vibrating tray whereby the hopper and tray are vibrated as a unit.

Another object is to provide an auxiliary roller device for agitating the olives passing from the hopper and prevent them from piling up in the passages of the tray.

Another object is to provide in a device of the character described a novel form of hopper in which congestion is avoided and a free flow of olives or other articles therefrom is attained.

Other objects and advantages will appear from the further description in the specification and by reference to the drawings.

In the drawings:

Figure 1 is a side elevation of a machine incorporating this invention.

Figure 2 is a considerably enlarged side elevation of the hopper, feeding and metering mechanism seen from the side opposite that of Figure 1.

Figure 3 is a plan view of the hopper looking in the direction of the arrow 3 in Figure 1.

Figure 4 is a plan view of the vibrating tray with parts in section taken on the line 4—4 of Figure 2.

Figure 5 is an enlarged fragmentary vertical section taken on the line 5—5 of Figure 3.

Our feeding mechanism 30 is illustrated in combination with a metering device 31, a spacing and positioning mechanism 32, and a pitting mechanism 33. The metering device is being claimed in the application of which this is a division and the pitting mechanism is being made the subject of another divisional application.

The feeding device comprises a hopper 40, the lower constricted end of which communicates with a vibrating tray 41 having a plurality of delivery passages 42.

Referring to Figures 2, 3, and 4, the hopper is formed with a distributing partition 43 comprising a ridge 44 with sloping sides 45 and a similar sloping end 46. A distributing partition having an oval configuration would function in substantially the same manner and is deemed by us to be equivalent. The sides 45 merge into the wall of the hopper following the circular contour thereof, and the end 46 extends to opposite sides of the hopper wall and terminates at its lower end in a straight edge 47 below which is thus formed a constricted passage 48 bounded above by the edge 47 and below by an inclined flat shelf member 49 which slopes downwardly and forwardly in the direction of general movement of olives through the feeding device.

The vibrating tray is formed with relatively high side walls 60, and intermediate low walls 61 defining the olive delivery passages 42. Preferably the walls 60 and 61 are parallel and the passages or channels 42 are wide enough and deep enough to accommodate a single line of the largest olives or other articles which the machine is designed to handle. In the drawings the olives are designated by the letter O. The passages or channels are formed with a V shaped trough seen in cross section in Figure 5. It has been found that by making the channels of the configuration described any size olives may be accommodated without any jamming of the olives. The present machine is designed with four such delivery passages formed in the tray 41. Generally speaking olives poured into the hopper 40 converge toward the passage 48 descending by gravity therethrough and are distributed into the four delivery passages 42. Further details of the mechanism by which this is accomplished will be later described.

The tray 41 is mounted upon a plurality of webs 51 slightly inclined from the vertical which are in turn carried upon a base plate 52. The webs 51 have sufficient rigidity to support the tray in its normal elevated position, which is a generally slight downward incline toward a metering mechanism, but are flexible enough to permit vibration of the tray by a magnetic vibrator 53 of conventional design, the armature 54 of which is connected at 55 to one end of the tray. Other forms of vibrators are available, and whether electrical or mechanical, if performing the function of vibrating the tray and hopper, are deemed by us to be equivalent. The base plate 52 is mounted upon coil springs 56 to isolate the vibration of the tray from main frame F. Conveniently these springs 56 may be mounted in sockets 56' formed in cross bars 57 which are secured to the frame, the cross bar at the rear being adjustable in height above the frame by means of adjusting screws 58.

The lower end of the hopper 40 which has a rectangular configuration indicated at 70 is mounted upon the rearward end of the tray 41 by means of screws 71. This effects a unitary construction between the vibrating tray 41 and the hopper 40 which results in the hopper as well as the tray being simultaneously vibrated when the device is in operation. It has been found especially advantageous to mount the hopper firmly on the vibrating tray so that the hopper derives the benefit of the vibratory action.

Mounted upon the forward portion of the rectangular section 70 of the hopper is a pair of oppositely disposed bracket members 75. These brackets are generally L shaped in configuration having lower longitudinal extensions 76 which are slidably positioned along the outer walls 60 of the vibrating tray. The brackets 75 are formed with slots 80 and 81 through which bolts 77 and 78 pass, the slots permitting longitudinal adjustment of the bracket members 75 on the hopper and the vibrating tray.

Mounted on the brackets 75 and extending across the vibrating tray 41 is a shear plate 85 which substantially closes the passage 48 above a roller 86 which will be described.

This roller 86 particularly illustrated in Figure 5, is mounted on a shaft 87 which is journaled in rubber bearings 88, the latter being supported in bearing collars 89 which are formed as a part of a longitudinal extension 76 of the bracket 75. At one end of the shaft 87 is keyed a V pulley 90, which is driven by belt 91 and which serves to rotate the roller 86. The belt 91 derives its power from a motor M through means illustrated in Figure 1 which need not be described in detail, as the belt 91 may be driven from any other source of power. The roller is preferably constructed wholly of or at least faced with rubber or material having similar characteristics and in its periphery is formed with an irregular surface the preferred design of which is illustrated in Figures 2, 4 and 5. This preferred design utilizes longitudinal grooves 95 and short helical grooves 96 arranged in parallel rows, the direction of the pitch being alternated progressively around the circumference of the roller. Formation of the grooves obviously result in raised beads or tread, as illustrated.

It is important to note that this roller is driven in the direction of the arrow in Figure 2 which is opposite the direction of the passage of the olives through the feeding mechanism. The roller is positioned and adjusted according to the size of olives so that there is room for only one layer of olives to pass between the roller and the outer end of the shelf 49, the latter being formed with a steep decline 97 adjacent the roller 86. The purpose of the rotating roller is to back up the olives which are descending by gravity aided by vibration and keep them in a state of movement so that they will not pile up and jam in the passage 48 nor overtax the capacity of the passages 42. The combined action of the vibrating tray and the reverse rotation of the roller 86 serves to effectively and continuously feed the olives from the hopper into the parallel individual olive passages or channels 42.

Vibration of the tray causes the olives to travel along delivery passages 42 toward the metering device 31, where subsequent handling of the olives occurs.

The purpose of this metering device is to receive the olives from the four delivery passages, space their subsequent travel and divert them into two inclined positioning chutes or troughs 100 which are part of the spacing and positioning mechanism 32. It has been found that four of the delivery passages are advisable to assure a continuous supply of olives to positioning chutes.

In operation power means are set in motion to rotate the roller 86, the electrical vibrator 53 is started to vibrate the entire assembly comprising the hopper and the tray, and olives from bulk are poured into the hopper. Olives gravitate through the passage 48 settling on the inclined shelf member 49 and traveling downwardly, dropping over the steep decline 97 and into the separate olive channels 42. The rubber faced roller 86 rotates against the travel of the olives and breaks up any accumulation of olives which might otherwise choke the discharge passage. The plate 85 which is adjustable, suitably closes the space from the upper part of the roller to the lower part of the hopper proper. Vibration, and the pitch of the tray 41 causes the olives to travel forwardly in single rows in the respective olive passages or channels for further handling in the metering mechanism or any other device with which the feeding mechanism may be associated.

What we claim as our invention is:

1. A feeding mechanism for fruit comprising:

a tray having fruit passages therein of a size to accommodate single rows of fruit in each, means for vibrating the said tray to cause travel of fruit longitudinally thereof, and a fruit receiving hopper mounted on the said tray for vibration therewith, the hopper having a discharge opening communicating with the vibrating tray for the movement of fruit from the hopper into the tray, the hopper being provided with a distributing shelf extending toward the rear portion of the hopper constricting the discharge opening whereby fruit in the forward part of the hopper is caused to roll toward the rear of the hopper and mingle with the fruit in the rear of the hopper in the region of the discharge opening to facilitate a continuous discharge of fruit into the passages.

2. A feeding mechanism comprising: an inclined tray, a hopper rigidly mounted on the tray in position to discharge therein, and means for vibrating the tray, whereby the vibratory action of the tray is imparted to the hopper, the hopper being provided with means diverting articles contained therein toward the rear of the hopper, and a shelf providing a runway for such articles from the rear part of the hopper to the said tray.

3. A feeding mechanism comprising: an inclined tray, a hopper rigidly mounted on the tray in position to discharge therein, and means for vibrating the tray, whereby the vibratory action of the tray is imparted to the hopper, the hopper being provided with means diverting articles contained therein toward the rear of the hopper, and a shelf providing a runway for such articles from the rear part of the hopper to the said tray, said shelf being formed with a relatively sharp decline at its forward end to accelerate delivery of the articles into the tray.

4. A feeding mechanism for fruit comprising: a tray having fruit passages therein of a size to accommodate single rows of fruit in each, means for vibrating the said tray to cause travel of fruit longitudinally thereof, a fruit receiving hopper mounted to discharge fruit into the tray, the hopper being provided with means diverting articles contained therein toward the rear of the hopper.

5. A feeding mechanism for fruit comprising: a tray having fruit passages therein of a size to accommodate single rows of fruit in each, means for vibrating the said tray to cause travel of fruit longitudinally thereof, a fruit receiving hopper mounted to discharge fruit into the tray, the hopper being provided with means diverting articles contained therein toward the rear of the hopper, and a shelf providing a runway for such articles from the rear part of the hopper to the said tray.

6. The feeding mechanism for fruit comprising: a tray having fruit passages therein of a size to accommodate single rows of fruit in each, means for vibrating the said tray to cause travel of fruit longitudinally thereof, a fruit receiving hopper mounted to discharge fruit into the tray, the hopper being provided with means diverting articles contained therein toward the rear of the hopper, a roller mounted above the tray, and means to rotate the roller in a direction opposite to the direction of travel of the fruit whereby some of the fruit moving from the hopper is temporarily restrained to prevent congestion or piling up of the fruit in the forward part of the tray.

7. A feeding mechanism for fruit comprising: a tray having an upper portion and a lower section with fruit passages in said lower section of a size to accommodate single rows of fruit in each passage, means for vibrating the said tray to cause travel of fruit longitudinally thereof, the tray being formed with a relatively steep decline at the entrance to said lower section to facilitate travel of fruit by gravity, a fruit receiving hopper mounted in position to discharge fruit into the upper portion of said tray, a roller mounted above the tray adjacent to and forwardly of the relatively steep decline thereof in position to afford clearance for the travel of not more than one layer of fruit of a predetermined size between the decline and the roller into the fruit passages of the tray, and means to rotate the roller in a direction opposite to the direction of travel of the fruit whereby some of the fruit moving from the hopper is temporarily restrained to prevent congestion or piling up of the fruit in the lower section of the tray.

8. A feeding mechanism for fruit comprising: a tray having fruit passages therein of a size to accommodate single rows of fruit in each, means for vibrating the tray to cause travel of fruit longitudinally thereof, a fruit receiving hopper mounted to discharge fruit into the tray, a roller mounted above the tray, and means to rotate the roller in a direction opposite to the direction of travel of the fruit whereby some of the fruit moving from the hopper is temporarily restrained to prevent congestion or piling up of the fruit in the forward part of the tray, said roller being formed with a surface tread characterized by a multiplicity of elevations formed by longitudinal grooves and short helical grooves arranged in parallel rows, the direction of the pitch of the short helical grooves being alternated progressively around the circumference of the roller.

9. In a feeding mechanism having a vibrating tray adapted to contain and deliver articles for further handling, a roller mounted above the tray at an elevation sufficient to permit a single layer only of articles to pass beneath, and means to drive said roller in the direction opposite the direction of travel of said articles, said roller being formed with a surface tread characterized by a multiplicity of elevations formed by longitudinal grooves and short helical grooves arranged in parallel rows, the direction of the pitch of the short helical grooves being alternated progressively around the circumference of the roller.

10. A feeding mechanism for articles comprising: a tray having an upper portion and a lower section with an article passage in said lower section, means for vibrating the said tray to cause travel of articles longitudinally thereof, the tray being formed with a relatively steep decline at the entrance to said lower section to facilitate travel of said articles by gravity, and a roller mounted above the tray adjacent to and forwardly of the relatively steep decline thereof in position to afford clearance for the travel of not more than one layer of articles of a predetermined size between the decline and the roller into the passage of the lower section of the tray, and means to rotate the roller in a direction opposite to the direction of travel of the said articles.

EDWARD P. DRAKE.
FRED J. ALBERTY.
WILLIAM HERBERT KAGLEY.